US009617687B2

(12) United States Patent
Mann et al.

(10) Patent No.: US 9,617,687 B2
(45) Date of Patent: Apr. 11, 2017

(54) METERABLE FIBROUS MATERIAL

(75) Inventors: Christopher A. Mann, Marysville, WA (US); David G Marsh, Covington, WA (US); Robert T. Hamilton, Seattle, WA (US); Charles E Miller, Federal Way, WA (US); Harshadkumar M. Shah, Bonney Lake, WA (US)

(73) Assignee: International Paper Company, Memphis, TN (US)

( * ) Notice: Subject to any disclaimer, the term of this patent is extended or adjusted under 35 U.S.C. 154(b) by 911 days.

(21) Appl. No.: 12/480,539

(22) Filed: Jun. 8, 2009

(65) Prior Publication Data

US 2010/0307702 A1    Dec. 9, 2010

(51) Int. Cl.
*D21H 17/00* (2006.01)
*D21H 25/00* (2006.01)
*B27N 3/08* (2006.01)
*C08L 97/02* (2006.01)
*C08L 101/00* (2006.01)

(52) U.S. Cl.
CPC ............. *D21H 25/005* (2013.01); *B27N 3/08* (2013.01); *C08L 97/02* (2013.01); *C08L 101/00* (2013.01); *D21H 17/00* (2013.01); *Y10T 428/2982* (2015.01)

(58) Field of Classification Search
USPC ............................................ 162/10; 428/402
See application file for complete search history.

(56) References Cited

U.S. PATENT DOCUMENTS

| 4,120,738 | A | 10/1978 | Tate |
| 4,176,570 | A | 12/1979 | Hutchins |
| 4,210,487 | A | 7/1980 | Driscoll |
| 4,491,502 | A | 1/1985 | Martin, Jr. |
| 5,695,874 | A | 12/1997 | Deaner et al. |
| 6,280,667 | B1 | 8/2001 | Koenig et al. |
| 6,465,379 | B1 | 10/2002 | Cook et al. |
| 6,632,863 | B2 | 10/2003 | Hutchison et al. |
| 6,730,249 | B2 | 5/2004 | Sears et al. |
| 2003/0039833 | A1 | 2/2003 | Sen et al. |
| 2003/0087996 | A1 | 5/2003 | Hutchison et al. |
| 2003/0093916 | A1 | 5/2003 | Vrbanac et al. |
| 2003/0096910 | A1 | 5/2003 | Soerens et al. |
| 2003/0213572 | A1 | 11/2003 | Vrbanac et al. |
| 2004/0041040 | A1 | 3/2004 | Dezutter et al. |

(Continued)

FOREIGN PATENT DOCUMENTS

| CN | 101365569 A | 2/2009 |
| EP | 1 418 268 A2 | 5/2004 |

(Continued)

OTHER PUBLICATIONS

Le Baillif, Marie, "The Effect of Processing on Fiber Dispersion, Fiber Length, and Thermal Degradation of bleached Sulfite Cellulose Fiber Polypropylene Composites," Journal of Thermoplastic Composite Materials, 2009; 22; 115 DOI: 10.1177/0892705708091608.

(Continued)

*Primary Examiner* — Jacob T Minskey
(74) *Attorney, Agent, or Firm* — Christensen O'Connor Johnson Kindness PLLC

(57) ABSTRACT

A particle or particles of cellulosic wood pulp fibers having a top and bottom face and a hexagonal perimeter, and methods of using it.

3 Claims, 2 Drawing Sheets

(56) References Cited

U.S. PATENT DOCUMENTS

| | | |
|---|---|---|
| 2004/0043217 A1 | 3/2004 | Dezutter et al. |
| 2004/0079449 A1 | 4/2004 | Kanekiyo et al. |
| 2005/0191262 A1 | 9/2005 | De La Poterie et al. |
| 2005/0225009 A1 | 10/2005 | Sain et al. |
| 2006/0006564 A1 | 1/2006 | Maldas et al. |
| 2007/0037721 A1 | 2/2007 | Michels et al. |
| 2007/0078050 A1 | 4/2007 | Fisher et al. |
| 2007/0190300 A1* | 8/2007 | Bell et al. .................. 428/294.7 |
| 2008/0179027 A1 | 7/2008 | Fish et al. |
| 2008/0182104 A1* | 7/2008 | Fish et al. .................... 428/403 |
| 2010/0307702 A1 | 12/2010 | Mann et al. |

FOREIGN PATENT DOCUMENTS

| | | | |
|---|---|---|---|
| GB | 1 362 344 | A | 8/1974 |
| JP | 61-149317 | A | 7/1986 |
| JP | 2000-239528 | A | 9/2000 |
| JP | 2003-191229 | A | 7/2003 |
| JP | 2004-97160 | A | 4/2004 |
| JP | 2004-148558 | A | 5/2004 |
| JP | 2007-523252 | A | 8/2007 |
| WO | 03/104309 | A1 | 12/2003 |
| WO | 2005/021458 | A1 | 3/2005 |
| WO | 2005/080496 | A1 | 9/2005 |
| WO | 2007/041168 | A2 | 4/2007 |
| WO | 2007/056839 | A1 | 5/2007 |

OTHER PUBLICATIONS

Henion Dicing Products, LLC, https://www.plasticdicing.com, May 20, 2009.
Decision of Refusal mailed Jun. 20, 2016, in Korean Patent Application No. 10-2015-7025959, filed Feb. 10, 2012, with partial English translation provided by foreign associate, 4 pages.
Notification of Reexamination mailed Aug. 23, 2016, in Chinese Patent Application No. 201280008898.6, filed Feb. 10, 2012, with English translation, 18 pages.
Extended European Search Report mailed Jul. 5, 2016, in European Patent Application No. 12 747 696.8, filed Feb. 10, 2012, 5 pages.
Result of Substantive Examination mailed Jun. 20, 2016, in Indonesian Patent Application No. W-00201303587, filed Feb. 10, 2012, with Machine Translation, 5 pages.
Extended European Search Report mailed Feb. 13, 2017, issued in corresponding European Patent Application No. 10 005 782.7, filed Jun. 3, 2010, 7 pages.

* cited by examiner

METERABLE FIBROUS MATERIAL

This relates to a cellulosic wood pulp in meterable form.

Cellulose wood pulp fibers can be used as a filler and/or reinforcement and/or property modifier in many materials. There is a need to be able to meter the amount of fiber being placed in the material so that there is a more even amount of fiber throughout the material.

As an example in the plastics industry, fillers and reinforcement materials are typically used to improve the properties of plastics. The addition of such materials can improve properties such as conductivity, strength, modulus values, notched impact resistance, density, absorbency, etc.

A partial list of plastic or polymeric materials which utilize fillers or reinforcing materials includes polyolefins, polyethylene, polypropylene, polyvinyl chloride, ABS, polyamides, mixtures of these, polyethylene terephthalate, polybutylene terephthalate, polytrimethylterephthalate, ethylene-carbon monoxide and styrene copolymer blends such as styrene/acrylonitrile and styrene/maleic anhydride thermoplastic polymers, polyacetals, cellulose butyrate, acrylonitrile-butadiene-styrene, certain methyl methacrylates, and polychlorotrifluoroethylene polymers.

Fibrous materials are used as reinforcements in plastics. Glass fibers are used as a reinforcing component for plastics. Glass fibers are used as a reinforcement material for both thermoset plastics and thermoplastics. Glass fibers are used to impart mechanical strength, dimensional stability, and heat resistance to the product. Glass fibers, however, increase the density and weight of the product, are costly, and are abrasive, abrading the processing equipment.

Mineral fibers are another material used as a filler and for reinforcement. They also are dense and add to the weight of the product. They are also abrasive.

Cellulosic wood pulp fibers do not have these disadvantages. Cellulosic wood pulp fibers have relatively low densities as compared to glass fibers or mineral fillers. For example, cellulose wood pulp fibers have a density of approximately 1500 kg/m$^3$ in comparison to a density of 2500 kg/m$^3$ for E grade glass fibers. This provides a product that is less dense and weighs less. This is an important consideration in many applications including, for example, automotive applications. Cellulosic wood pulp fibers are not as abrasive as glass fibers and do not abrade the processing equipment to the same extent as glass fibers or mineral fillers.

Cellulose wood pulp fibers can be used as reinforcing and filler in thermoset or thermoplastic materials, as reinforcing in fiber-cement material, combined with more dense material as a densification modifier to make the combined product less dense and have less weight, and combined with other materials to make them more absorbent or to absorb at a faster rate.

In each of these uses it is necessary to have an understanding of the amount of fiber that is being added and for the fiber to be added in a uniform manner. It would be beneficial to have a cellulosic wood pulp fiber that is in a form that would allow it to be easily and uniformly meterable.

DESCRIPTION

Figure 1:
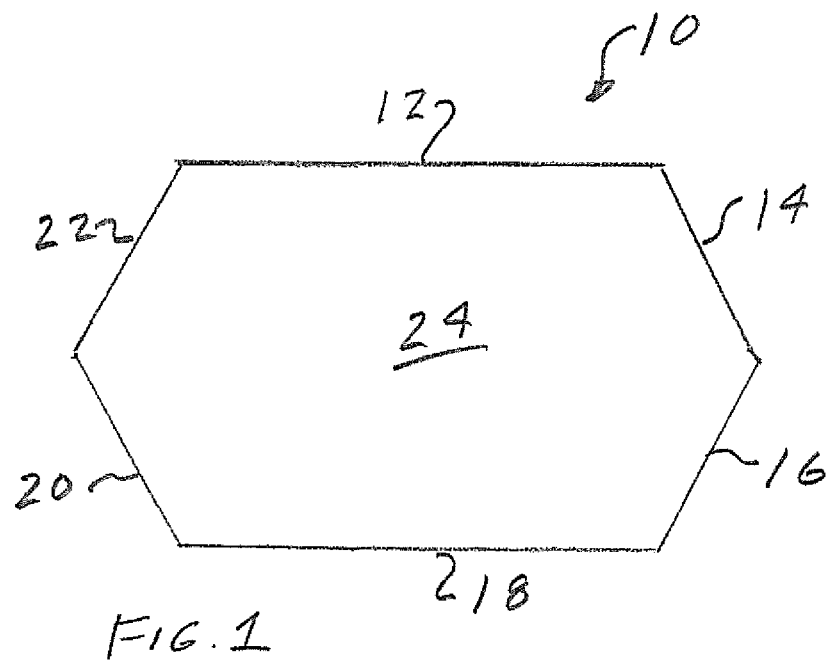
FIG. 1 is a top plan view of an embodiment of the invention.

The present invention can utilize a number of tree species as the source of the pulp, paperboard and paper fibers. Coniferous and broadleaf species and mixture of these can be used. These are also known as softwoods and hardwoods. Typical softwood species are various spruces (e.g., Sitka Spruce), fir (Douglas fir), various hemlocks (Western hemlock), tamarack, larch, various pines (Southern pine, White pine, and Caribbean pine), cypress and redwood or mixtures of same. Typical hardwood species are ash, aspen, cottonwood, basswood, birch, beech, chestnut, gum, elm, eucalyptus, maple oak, poplar, and sycamore or mixtures thereof. Recycled cellulosic material can be used as starting material for the fibers. The present invention can use chemical, mechanical, thermomechanical and chemithermomechanical pulp. Kraft, sulfite and soda chemical pulps can be used. The fibers can be bleached or unbleached. The present invention can be used with unbleached Douglas fir chemical pulp fibers.

The use of softwood or hardwood species may depend in part on the fiber length desired. Hardwood or broadleaf species have a fiber length of 1-2 mm. Softwood or coniferous species have a fiber length of 3.5 to 7 mm. Douglas fir, grand fir, western hemlock, western larch, and southern pine have fiber lengths in the 4 to 6 mm range. Pulping and bleaching may reduce the average length slightly because of fiber breakage.

In the manufacture of pulp woody material is disintegrated into fibers either in a chemical or mechanical type process. The fibers can then optionally be bleached. The fibers are then combined with water in a stock chest to form a slurry. The slurry then passes to a headbox and is then placed on a wire, dewatered and dried to form a pulp sheet. Additives may be combined with the fibers in the stock chest, the headbox or both. Materials may also be sprayed on the pulp sheet before, during or after dewatering and drying.

Traditionally, pulp has been added to other materials either in sheet, bale or fibrous form after the pulp sheet or bale has been comminuted or slurried. It would be advantageous to have pulp in alternative form, such as particles, that could be metered in metering devices well known in the art. In the present invention it has been found that cellulosic wood pulp fibers can be made into particulate form and the shape of these particles will determine the speed and uniformity by which the fiber can be metered and processed. A particle having a hexagonal shape can be fed faster and more uniformly than a particle having a square shape.

In one embodiment the particles are placed in a metering system. The particles are placed in a volumetric or weight loss system and metered and conveyed to the next process step. In one embodiment a single or twin screw feeder is used to meter and convey the particles into the next process step. The next process step will depend on the material with which the particles are being mixed. The material can be a thermoset or thermoplastic material, an aqueous solution for cement such as portland cement or a dry material such as clay or loam. In some embodiments the particles will be formed into fibers, fiber bundles or a mixture of fibers and fiber bundles before or during the mixing. In other embodiments the particles may substantially remain as particles during the mixing.

A partial list of plastic or polymeric materials which can utilize the cellulose wood pulp fibers can include polyolefins, polyethylene, polypropylene, polyvinyl chloride, ABS, polyamides, mixtures of these, polyethylene terephthalate, polybutylene terephthalate, polytrimethylterephthalate, ethylene-carbon monoxide and styrene copolymer blends such as styrene/acrylonitrile and styrene/maleic anhydride thermoplastic polymers, polyacetals, cellulose butyrate, acrylonitrile-butadiene-styrene, certain methyl methacrylates, and polychlorotrifluoroethylene polymers. A complete list of thermoset or thermoplastic material which can utilize cellulose wood pulp fiber is known to those skilled in the art.

Cellulosic wood pulp fibers can be in the form of commercial cellulosic wood pulps, bleached board and paper. These materials are typically delivered in roll or baled form. The thickness of the pulp sheet, paper or board (the fiber sheet) is one factor that can determine the thickness of the particle. The fiber sheet has two opposed substantially parallel faces and the distance between these faces will be the thickness of the particle. A typical fiber sheet can be from 0.1 mm to 4 mm thick. In some embodiments the thickness may be from 0.5 mm to 4 mm. One of the other factors affecting the particle thickness is the presence of any pretreatment to the fiber sheet. Thus the particle can be thicker or thinner than the fiber sheet.

The fiber sheet, and the particles, can have a basis weight of from 12 g/m² (gsm) to 2000 g/m². In one embodiment the particles could have a basis weight of 600 g/m² to 1900 g/m². In another embodiment the particles could have a basis weight of 500 g/m² to 900 g/m². For a paper sheet one embodiment could have a basis weight of 70 gsm to 120 gsm. In another embodiment a paperboard could have a basis weight of 100 gsm to 350 gsm. In another embodiment a fiber sheet for specialty use could have a basis weight of 350 gsm to 500 gsm.

Pulp additives or pretreatment may also change the character of the particle. A pulp that is treated with debonders will provide a looser particle than a pulp that does not have debonders. A looser particle may disperse more readily in the material with which it is being combined.

The particle has a hexagonal shape, one embodiment of which is shown in FIG. 1. The hexagon can be of any type from fully equilateral to fully asymmetric. If it is not equilateral, the major axis may be from 4 to 8 millimeters (mm) and the minor axis may be from 2 to 5 mm. Some of the sides of the hexagon may be of the same length and some or all of the sides may be of different lengths. The circumference or perimeter of the hexagon may be from 12 mm to 30 mm and the area of the upper or lower face 24 or 26 of the particle may be from 12 to 32 mm². In one embodiment the particles could have a thickness of 0.1 to 1.5 mm, a length of 4.5 to 6.5 mm, a width of 3 to 4 mm and an area on one face of 15 to 20 mm². In another embodiment the particles could have a thickness of 1 to 4 mm, a length of 5 to 8 mm, a width of 2.5 to 5 mm and an area on one face of 12 to 20 mm².

Two examples of a hexagonally shaped particle are shown.

Figure 2:
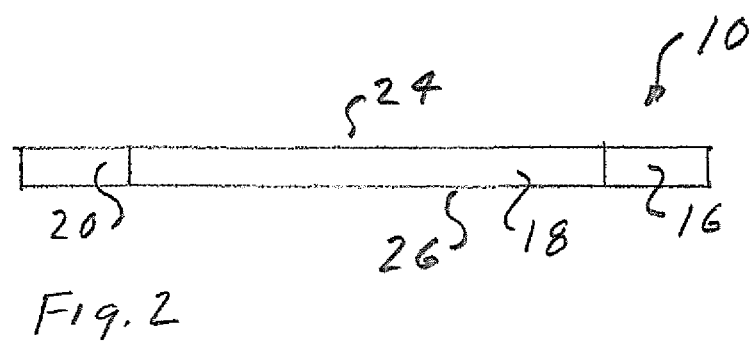
FIG. 2 is a side plan view of the embodiment of FIG. 1
Figure 3:
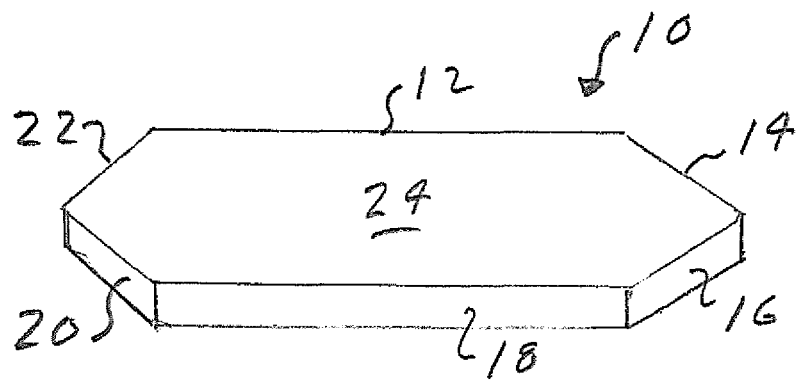
FIG. 3 is an isometric view of the embodiment of FIGS. 1 and 2.

In FIGS. 1-3, particle 10 is hexagon shaped and has two opposed sides 12 and 18 which are equal in length and are longer than the other four sides 14, 16, 20 and 22. The other four sides 14, 16, 20 and 22 may be the same length, as shown, or the four sides may be different lengths. Two of the sides, one at each end such as 14 and 20 or 14 and 22 may be the same length, and the other two at each end, 16 and 22 or 16 and 20, may be the same length or have different lengths. In each of these variations, the sides 10 and 18 may be the same length or of different lengths. The edges of the particles may be sharp or rounded.

The distance between the top 24 and bottom 26 of particle 10 may be from 0.1 mm to 4 mm.

Figure 4:
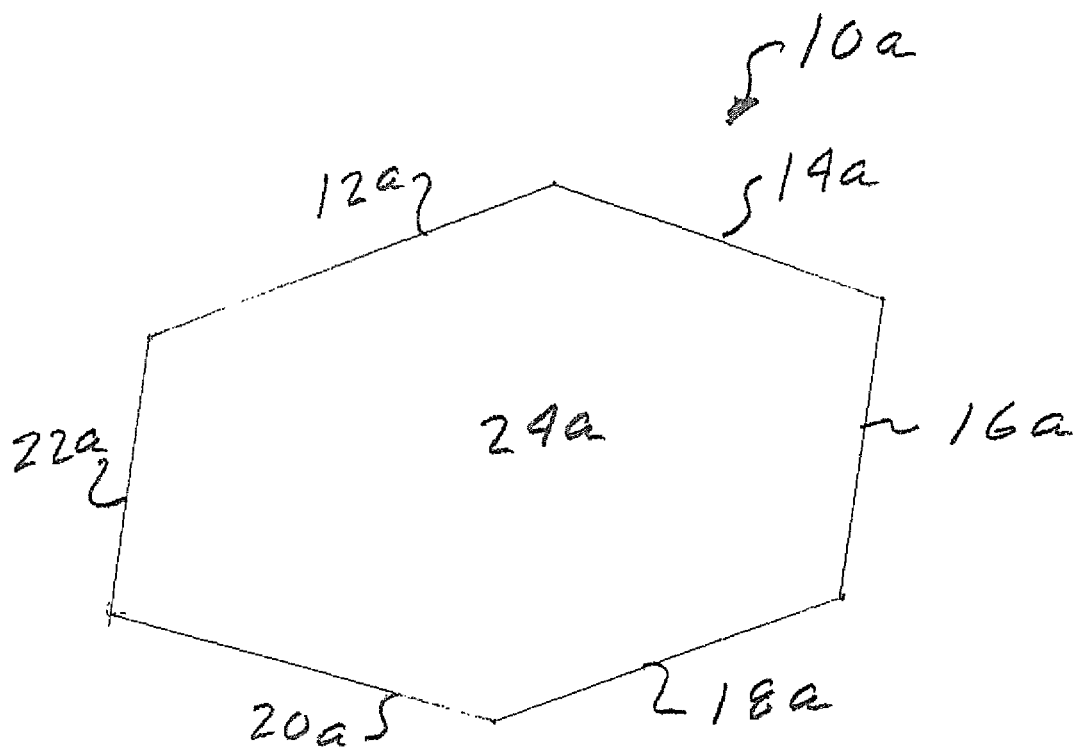
FIG. 4 is a top plan view of another embodiment of the invention.
Figure 5:
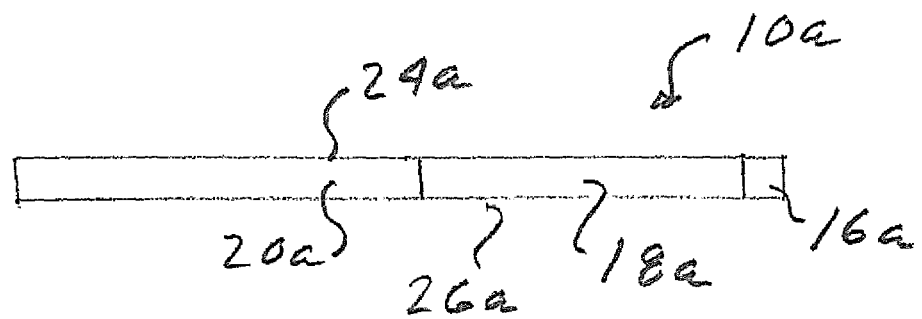
FIG. 5 is a side plan view of the embodiment of FIG. 4

FIGS. 4 and 5 illustrate an embodiment in which each of the six sides the hexagon is of a different length. The embodiment shown is illustrative and the order of the lengths of the sides and size of the lengths of the sides can vary.

Particles of the shape, size and basis weight described above can readily be metered in weight loss and volumetric feeder systems well known in the art.

The alignment of the fibers within the particle can be parallel to the major axis of the hexagon or perpendicular to the major axis of the hexagon or any orientation in between.

The hexagonal particles can be formed on a Henion dicer, but other means could be used to produce a hexagonal particle.

The hexagonal particles have a number of advantages over square or rectangular particles. A particle with a hexagonal circumference can be produced faster than a particle with a rectangular or square circumference and can be metered faster than a particle with a rectangular or square circumference. In one embodiment, hexagonal particles are produced at 1.6 times the rate of square particles.

As an example of the benefits provided by hexagonal particles, a CF 405 pulp from the Weyerhaeuser NR Company, Columbus, Miss. mill was formed into a hexagonal particle 6.14 mm (~¼ inch) on the long axis and 3.36 mm (~⅛ inch) on the short axis, a ³⁄₃₂ inch (2.38 mm) square particle and a ⅛ inch (3.18 mm) square particle. The particles were metered through both a twin screw and single screw feeder. Standard vibration agitation as routinely practiced in the art was used to prevent bridging. The rotational speed range was the same for the three particles for each test. The amounts fed through the twin screw feeder in pounds/hour/rpm were 1.61 for the hexagonal particles, 1.16 for the ³⁄₃₂" square particles and 0.905 for the ⅛" square particles. The amounts fed through the single screw feeder in pounds/hour/rpm were 1.73 for the hexagonal particles, 0.45 for the ³⁄₃₂" square particles and 0.65 for the ⅛" square particles.

The invention claimed is:

1. A cellulosic wood pulp fiber particle having two opposed faces and a hexagonal perimeter, a major axis length of 4 to 8 mm, a width of 2 to 5 mm and a thickness of 0.1 mm to 4 mm,
   wherein the wood pulp fiber is in the form of a wood pulp sheet, a paperboard sheet, or a paper sheet,
   wherein the particle has a basis weight of 70 to 120 g/m².

2. A cellulosic wood pulp fiber particle having two opposed faces and a hexagonal perimeter, a major axis length of 4 to 8 mm, a width of 2 to 5 mm and a thickness of 0.1 mm to 4 mm,
   wherein the wood pulp fiber is in the form of a wood pulp sheet is in the form of a wood pulp sheet, a paperboard sheet, or a paper sheet,
   wherein the particle has a basis weight of 100 to 350 g/m².

3. A cellulosic wood pulp fiber particle having two opposed faces and a hexagonal perimeter, a major axis length of 4 to 8 mm, a width of 2 to 5 mm and a thickness of 0.1 mm to 4 mm,
   wherein the wood pulp fiber is in the form of a wood pulp sheet is in the form of a wood pulp sheet, a paperboard sheet, or a paper sheet,
   wherein the particle has a basis weight of 350 to 500 g/m².

* * * * *